Inventor:
George H. Truran

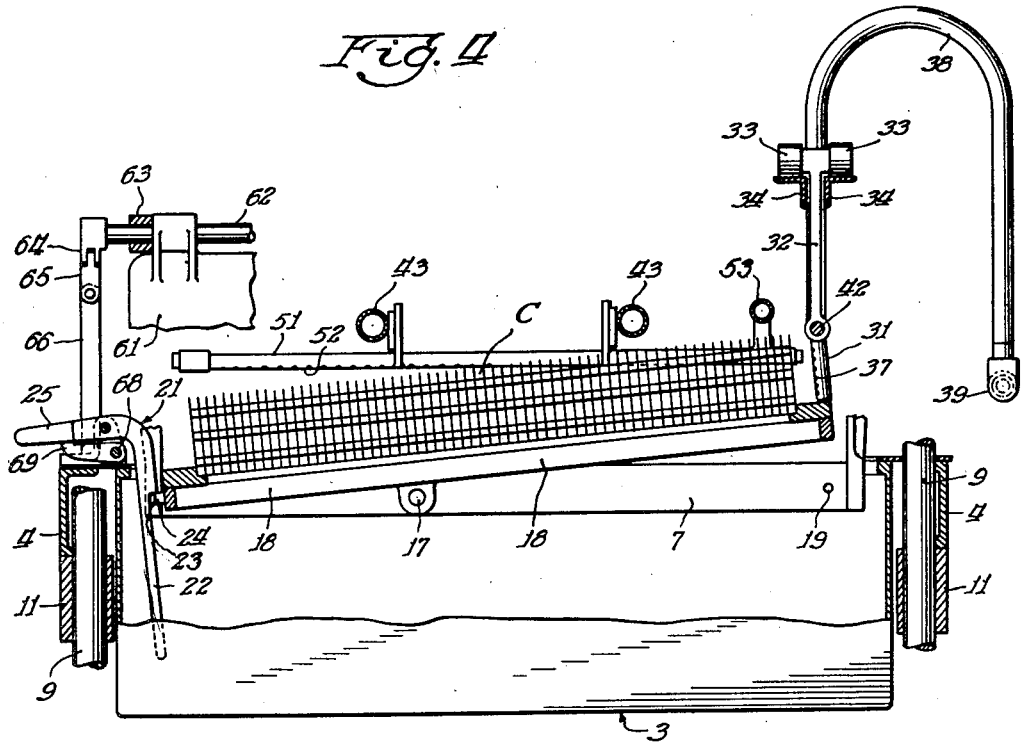
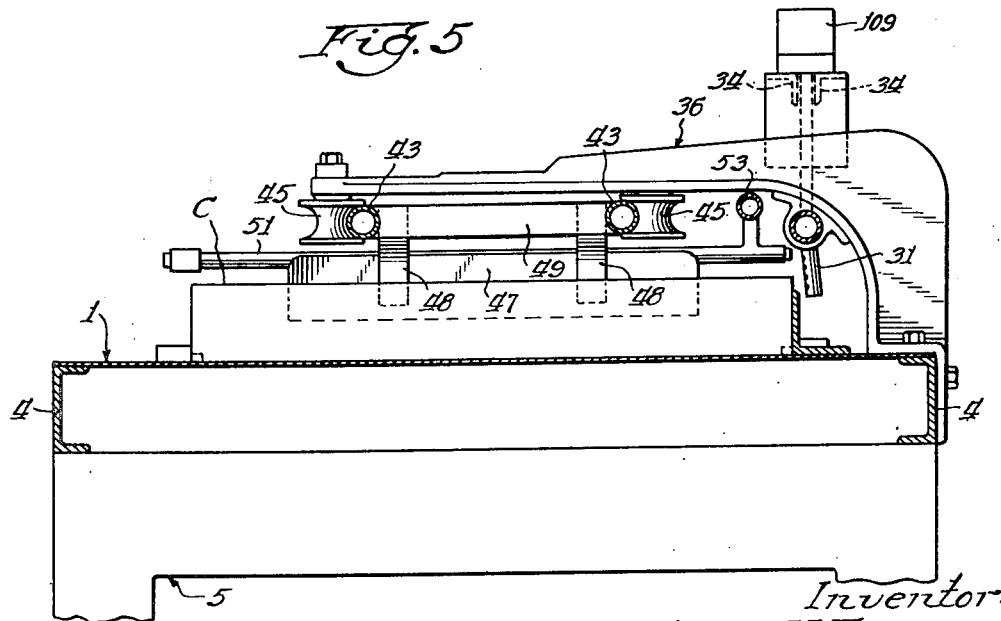

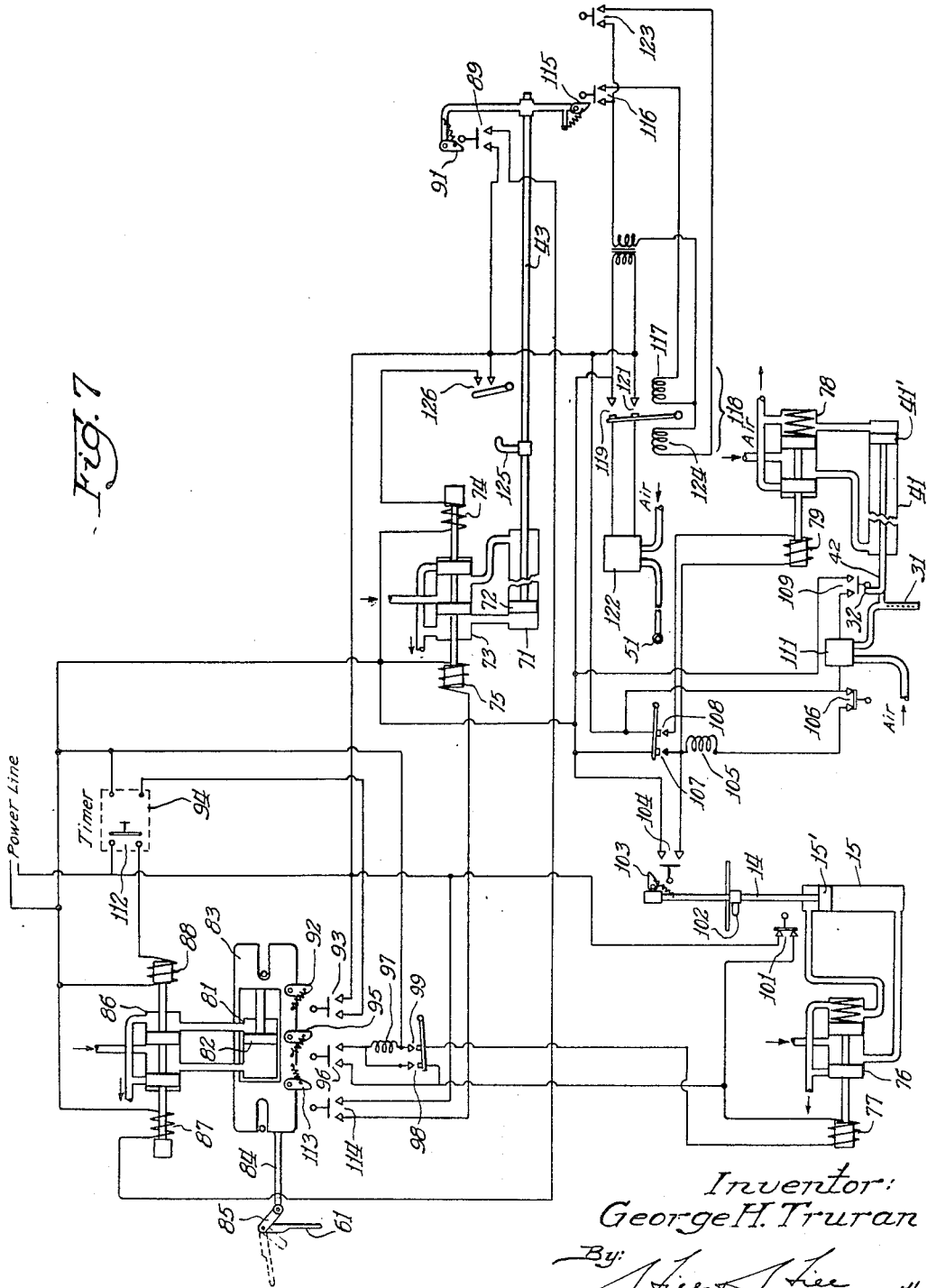

Patented Jan. 27, 1953

2,626,417

UNITED STATES PATENT OFFICE 2,626,417

APPARATUS FOR REMOVING EXCESS FLUX-ING LIQUID FROM RADIATOR CORES

George H. Truran, La Porte, Ind., assignor to Modine Manufacturing Company, Racine, Wis., a corporation of Wisconsin Application January 2, 1947, Serial No. 719,765

7 Claims. (Cl. 15—304)

The invention relates generally to the manufacture of radiator cores and similar articles, which consist of a multiplicity of thin walled metal tubes, having a multiplicity of spaced metal fins attached thereto and more particularly to an apparatus for removing excess soldering flux from said cores preparatory to bonding the fins to the tubes.

In the manufacture of radiator cores, as more at length defined in Patent No. 2,154,104, to H. S. Munch et al., issued April 11, 1939, prior to the assembly of the tubes and fins, the tubes are thoroughly tinned with solder, the fins having apertures to snugly receive the tubes, so that the peripheral edges of the apertures lie in close contact with the outer walls of the tubes. The securement between the fins to the tubes is effected by first dipping the core into an acid bath to provide a flux which enables the solder to adhere to the untinned fins, and then the entire core subjected to a heat treatment at a sufficiently high temperature to melt the solder on the tubes and cause it to run into the adjacent portion of the fins. The above referred to patent discloses a structure by means of which these functions may be accomplished.

The present invention is directed to the removal of excess soldering flux from the core subsequent to the dipping thereof into the flux bath, and has among its objects the production of a device which will efficiently remove the excess fluxing liquid both from between the tubes and on the fins of the core, thus resulting in a considerable saving in fluxing liquid, as well as reducing the heating period required for bonding.

Another object of the invention is the provision of such a device which is automatic in its operation, so that it may be readily employed in combination with automatically operated apparatus for performing the several operations on the core.

Thus the present invention contemplates the production of an apparatus which is completely automatic in its operation from the time the unsoldered core is positioned on the machine to the time it is removed therefrom as a soldered assembly.

Other objects and advantages of the construction herein shown and described will be obvious to those skilled in the art from the disclosure herein given.

To this end my invention consists in the novel construction, arrangement and combination of parts herein shown and described, and more particularly pointed out in the appended claims. Certain features disclosed but not claimed herein are disclosed and claimed in my divisional application 239,911, filed July 31, 1951.

In the drawings, wherein like reference characters indicate like or corresponding parts:

Fig. 4 is a sectional view similar to Fig. 3, with the core shown in tilted position subsequent to dipping in the flux bath;

Fig. 5 is a sectional view taken approximately on the line 5—5 of Fig. 1;

Fig. 7 is a diagrammatical illustration of the hydraulic and electrical system of control of the apparatus.

The present invention is utilized in conjunction with core-baking ovens, similar to that disclosed in the above patent, and a dipping tank similar to that shown in said patent, and claimed in Divisional Patent No. 2,229,184, issued January 21, 1941.

In the above patented apparatus, the core is dipped in the flux, and upon its removal therefrom occupies a tilted position to permit excess flux to drain from the tubes, following which it is dropped to a horizontal position.

The present invention provides means for efficiently blowing the excess flux from the tubes while the core is in such a tilted position, and subsequently blowing excess flux from the fins after the core has been dropped into a horizontal position by the use of air under pressure, these functions being performed automatically in conjunction with mechanism for moving the core over the dip tank into the oven following the fluxing operation. It will be apparent that any excess flux on the core must be evaporated off in the heating oven, and consequently lost. The use of the present invention has resulted in an average saving of twenty gallons of flux in an eight hour period of operation, with an average reduction in the baking or heating period of seven seconds per core.

The dip tank

Figure 1:
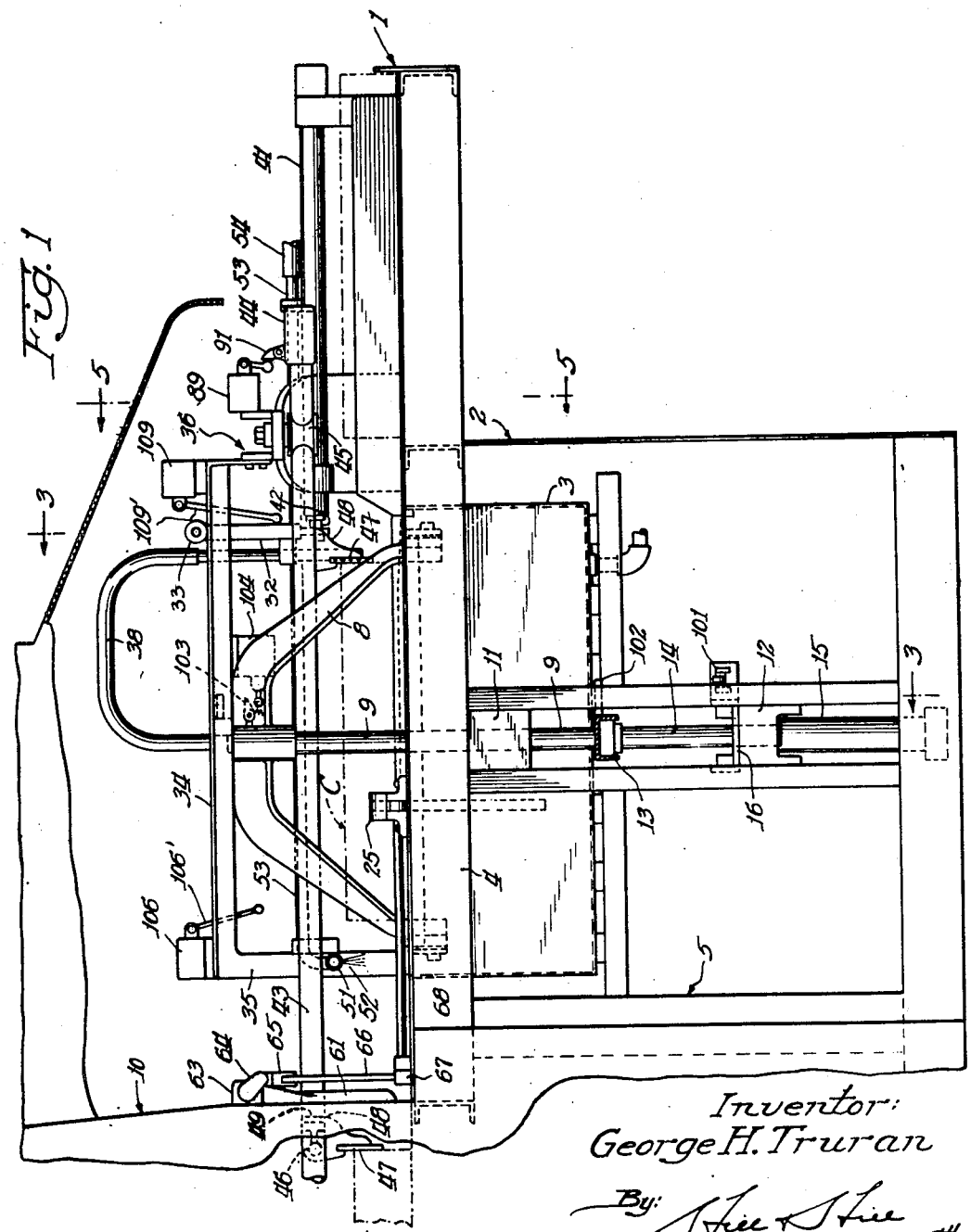
Fig. 1 is a side elevational view of the present invention, in conjunction with a dipping tank, a portion of the oven and conveying mechanism employed.
Figure 2:
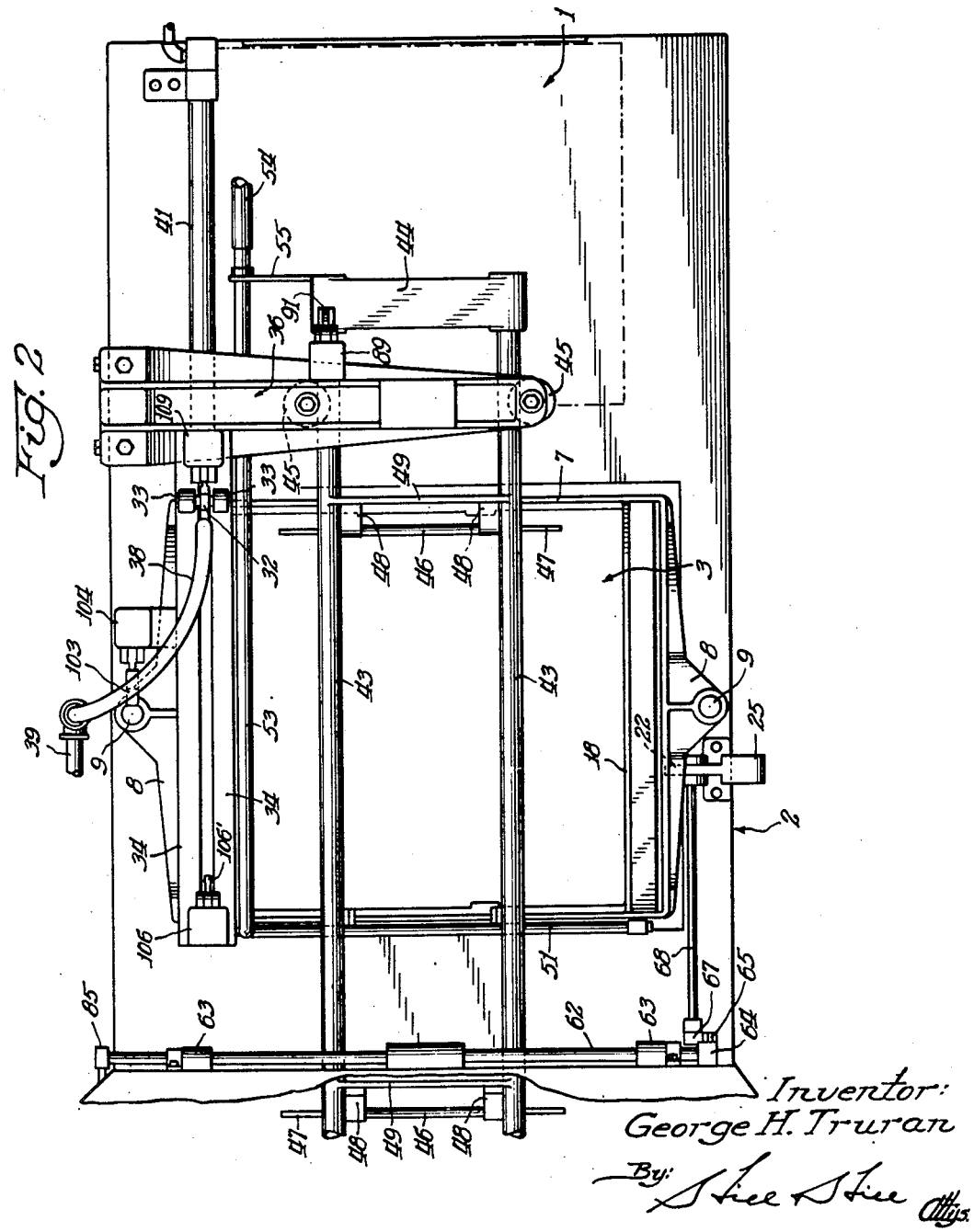
Fig. 2 is a top plan view of the structure illustrated in Fig. 1.
Figure 3:
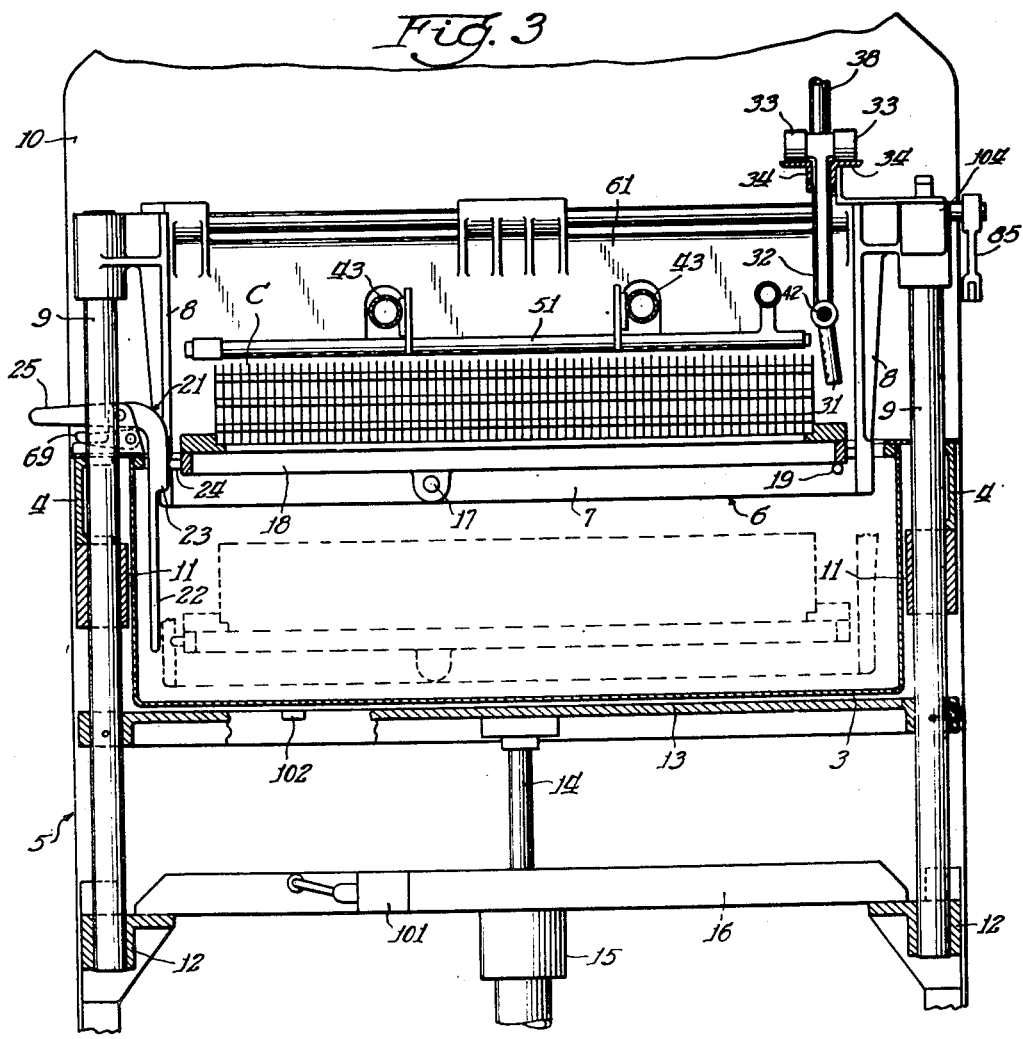
Fig. 3 is a sectional view taken approximately on the line 3—3 of Fig. 1.
Figure 6:
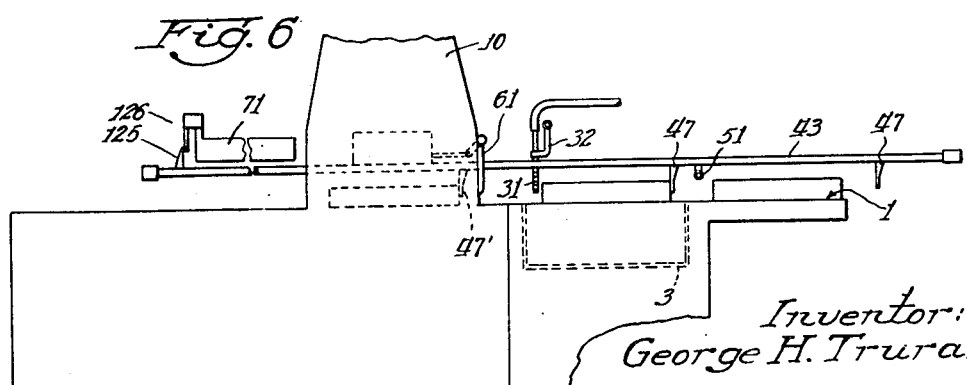
Fig. 6 is a view similar to Fig. 1, showing the relationship of the various elements of the apparatus illustrated in Fig. 1, and details of the conveying mechanism.

Referring to the drawings, and particularly to Figs. 1, 2 and 3, I designates generally an initial core-receiving table, positioned adjacent a dip tank, indicated generally by the numeral 2, the latter comprising a rectangularly shaped tank 3, open at its top, supported by a frame 4, which also supports the table 1, the frame 4 in turn being supported by suitable base structure, indicated by the numeral 5. Positioned above the tank 3 is a dipping structure indicated generally by the numeral 6, comprising a vertically movable carrier member 7, supported at opposite sides by a pair of yokes 8, mounted at their upper ends on sliding rods 9, the latter each being axially slidable in respective pairs of guides 11 and 12, rigidly carried by the supporting structure 5. The rods 9 are rigidly connected to a cross-member 13, positioned below the tank 3, the cross-member 13 being operatively connected through the rod 14 to the piston of a hydraulic cylinder indicated generally by the numeral 15, the upper end of the cylinder 15 being illustrated as connected to a cross-member 16, rigidly secured to the supporting structure 5. Thus the movement of the piston in the hydraulic cylinder 15 will raise and lower the carrier 7 into or out of the dip tank 3.

Pivotally secured at 17 to the carrier 7, is a pivotally mounted core supporting frame or tray 18, the carrier 7 having a stop member 19, engageable with the frame 18 for normally supporting the same in a horizontal position. It will be apparent that as the pivotal connection 17, between the carrier 7 and the frame 18, is offset from the center of the frame, the weight of the frame 18 and core C will maintain the frame in a horizontal position. Pivotally carried by the frame 4 is a latch member, indicated generally by the numeral 21, having a downwardly depending portion 22 extending into the dip tank 3, the portion 22 having a shoulder 23 thereon adapted to engage a lug 24 on the frame 18 as the latter is being elevated from the tank. The opposite end 25 of the latch member 21 is sufficiently weighted to constantly urge the portion 22 in engagement with the lug. Thus the frame 18 will remain horizontal during its descent into the tank 3, but as the carrier 7 moves upwardly the lug 24 will engage the shoulder 23 on the latch member 22, continued upward movement of the carrier 7 resulting in tilting of the frame 18 and core C to the position illustrated in Fig. 4.

It will be apparent that by rotating the latch member 21 out of engagement with the lug 24, gravity will cause the frame 18 and core C to resume a horizontal position.

Tube blow-off mechanism

The mechanism for blowing surplus flux out of the tubes of the core C, comprises a blow-off pipe 31, carried by a vertically extending arm 32, supported by rollers 33 movable along a pair of horizontal track members 34, the arm 32 being positioned between the members 34. The latter are supported at one end by a suitable standard 35, and at the opposite end by a standard indicated generally by the numeral 36.

Referring to Fig. 4, it will be noted that the blow-off pipe 31 is positioned adjacent the end of the core C when the latter is in tilted position, movement of the arm 32 along the track members 34 carrying the pipe 31 across the open ends of the core C. The pipe 31 is provided with a series of apertures 37, through which air under pressure may be discharged along the adjacent end of the core into the tubes thereof, the lower end of the pipe being closed and the upper end connected by a hose 38 to an air supply line 39. The arm 32 is connected by means of a connecting rod 42, to the piston of an air cylinder 41 rigidly supported by suitable means from the table 1. Thus by admitting air to one end of the cylinder 41, the arm 32 will travel horizontally in one direction along the track 34, and when air is admitted to the opposite end of the cylinder, the arm 32 will return to its original position.

The core conveying mechanism

The core is moved from its initial position on the table 1 to the dip tank 3, and from the dip tank 3 to the oven 10 by a pair of pusher rods 43, rigidly connected at their ends by a cross-member 44, and slidable on rollers 45, carried by the standard 36, the opposite ends of the rods 43 being suitably connected, and supported in like manner at suitable intervals. Carried by cross-members 46, connecting the rods 43, are suitable core-engaging dogs, indicated generally by the numeral 47, the latter being rotatably mounted on the cross-members 46, and provided with lugs 48, engageable with respective cross-members 49 carried by the rods 43. Thus movement of the rods 43 in a direction towards the oven 10 will cause engagement of the respective dogs 47 with a core positioned over the dip tank 3 or on the table 1, lugs 48 and cross-members 49 maintaining the dogs 47 in core-engaging position, so that further movement of the rods 43 will result in the respective cores being pushed to the next station.

However, as the dogs 47 are free to rotate in the opposite direction, that is, clockwise, as looking at the same in Fig. 1, return movement of the rods 43 in a direction away from the oven 10 will result in no movement of the cores at the respective stations, as the dogs 47, upon engagement with a core, will rotate upwardly and pass over any such core.

Fin blow-off mechanism

Also carried by the pusher rods 43 is a blow-off pipe 51, extending horizontally across the device and positioned above the plane of the top surface of the core C when the latter is in a horizontal position over the dip tank 3. The pipe 51 is provided with a plurality of outlets 52 along the bottom thereof, and is connected to a source of air through a pipe 53 rigidly carried by the rods 43 and hose 54, the free end of the pipe 53 being supported by an arm 55 secured to the cross-member 44. Thus air under pressure may be supplied through the hose 54 to the blow-off pipe 51 as the pusher rods move away from the oven 10, whereby air is directed on the fins of a dipped core as the pipe 51 passes over the same.

The oven 10, which may be of similar construction to that illustrated in Patent No. 2,154,104, is provided with a door 61 for closing the inlet to the oven, the door 61 being rigidly connected to a rod 62 journaled in support members 63, so that the door may be opened by rotating the rod 62; rotation of the rod being accomplished through a hydraulic cylinder diagrammatically shown in Fig. 7, or other means. Rigidly connected to the rod 62 is a lever 64, operatively connected through links 65 and 66 to an arm 67, rigidly carried by a rotatable shaft 68, supported by the frame 4. The opposite end of the shaft 68 is rigidly connected to a trip arm 69 positioned below the portion 25 of the latch member 21. Thus, when the door 61 is open, such movement will cause the trip arm 69 to be rotated upwardly and engage the portion 25 of the latch member 21, thereby rotating the depending portion 22 out of engagement with the lug 24 on the core carrying frame 18, thus permitting the latter to assume the horizontal position.

The sequence of operation of the mechanism so far described, is as follows:

A core is placed on the table 1 and moved by the pusher rods 43 onto the frame 18 of the dipping mechanism. The tray and core are then immersed in the flux and immediately raised therefrom, the core assuming a tilted position, as illustrated in Fig. 4 when completely elevated. Air is then admitted to the air cylinder 41 to move the pipe 31 across the core, and returned to the position illustrated in Fig 1. As soon as the tube 31 starts to travel, it is connected to air under pressure, so that air is blown across the ends of the core tube, the air being disconnected when the tube returns to its starting position.

Assuming a core has been positioned in the oven for heating during this operation, upon completion of the heating period, the door 61 is opened, which in turn releases the latch member 21, permitting the core frame 18 and core C to assume a horizontal position. Pusher rods 43 are then actuated in a direction away from the oven, at the same time air being admitted to the fin blow-off pipe 51, so that air is blown across the core fins as the pipe 51 moves across the same. Movement of the pusher rods 43 continues until they reach the end of their return travel, at which point the air is shut off to the pipe 51, and the movement of the pusher rods reversed. Dogs 47 having passed over the core on the tray 18 and the core on the table 1, upon forward or loading movement of the pusher rods 43 pick up the respective cores moving the core on the tray 18 into the oven, and the core on the table 1 onto the tray 18, simultaneously a similar dog may remove the heated core from the oven 10. As the pusher rods 43 cease traveling, the door 61 closes, the closing of the door initiating the timing action for the core being heated in the oven and the actuation of the core dipping mechanism to immerse the core than positioned on the tray 18, thus starting another cycle of operation.

Control mechanism

Fig. 7 is a diagrammatical illustration of the electrical and hydraulic mechanism employed for performing the sequence of operations above described. The pusher rods 43 are actuated by a hydraulic cylinder 71, having a piston 72 operatively connected to the rods 43, controlled by a two-way hydraulic valve 73, actuated by solenoid windings 74 and 75. Likewise, the hydraulic cylinder 15 on the dip tank is controlled by a two-way spring biased hydraulic valve 76, actuated by a solenoid winding 77, and in like manner the air cylinder 41 is controlled through a spring biased two-way valve 78, actuated by a solenoid winding 79. The door opening and closing mechanism may be actuated by any suitable means as, for example, a hydraulic cylinder 81, having a piston 82 operatively connected to a slidable member 83, the latter being connected by suitable linkage 84 to a lever 85, rigidly connected to the rod 62, which carries the door 61. The piston 82 is controlled by a two-way hydraulic valve 86, actuated by solenoid windings 87 and 88. The winding 87, which moves the valve 86 in position to move the piston 82 and member 83 to the right, looking at it as in Fig. 7, thereby closing the door 61, is actuated by a normally open switch 89, adapted to be closed by a stop 91, carried by the pusher rods 43. The stop 91 instantaneously closes the switch 89 when the rods 43 have substantially reached the end of their travel towards the oven 10, and a spring biased stop 92, carried by the member 83, instantaneously closes switch 93 as the door 61 is closed, thus setting a timer 94 in operation, the latter being set for any desired heating period. At the same time the switch 93 closes, a spring biased stop 95, also carried by the member 83, instantaneously closes a switch 96, thereby energizing relay 97, which is provided with one set of locking-in contacts 98, and a second set of contacts 99, which closes the circuit to the solenoid 77 of the dip tank, solenoid 77 being connected in closed series with a normally closed switch 101. Actuation of the solenoid 77 actuates the valve 76 to admit fluid into the top of the cylinder 15 of the dip tank, thereby forcing the piston 15¹ downward to lower the tray 18 and core into the liquid flux.

As illustrated in Fig. 3, the switch 101 is mounted on the cross-member 16, and adapted to be opened by a lug 102, carried by the cross-member 13. Thus as the tray 18 reaches the end of its downward travel, the lug 102 opens the switch 101, thereby breaking the circuit to the solenoid 77 and deenergizing the relay 97. The valve 76, through action of the bias spring, then returns to its normal position, illustrated in Fig. 7, whereby fluid is admitted to the bottom of the cylinder 15, returning the piston 15¹ and the core-carrying tray 18 to its elevated position, the core being tilted, as previously described, as it reaches the end of its upward movement. As the tray reaches the end of its upward movement, a spring biased stop member 103, carried by one of the yokes 8, instantaneously closes a switch 104 to actuate a relay 105 connected to the power line through a normally closed switch 106. The relay 105 is provided with a pair of lock-in contacts 107 and a second pair of contacts 108 which, upon actuation of the relay, closes the circuit to the solenoid winding 79, thus actuating the valve 78, whereby air is admitted to the right end of the cylinder 41.

As illustrated in Figs. 1 and 7, the arm 32 engages the switch arm 109¹ of a normally closed switch 109, which is connected in series with a magnetic air valve 111 to the power line. Switch 109 is held open by the arm 32 when the latter is in its normal position, illustrated in Fig. 1, and, as the arm 32 and pipe 31 are moved across the end of the core, due to air pressure at the right end of the air cylinder 41, switch 109 immediately closes upon disengagement of the arm 32 therewith, thus actuating valve 111 and connecting pipe 31 with an air supply A. The arm continues its movement until it strikes the actuating arm 106¹ of the switch 106, thereby opening the latter and deenergizing the relay 105, which in turn deenergizes the winding solenoid 79 to reverse the spring biased valve 78 and the air pressure on the piston 41¹ to return the arm 32 to its starting position. As the latter reaches such starting position, illustrated in Fig. 1, it again engages the arm 109¹ of the switch 109 to open the latter and shut off the supply of air to the pipe 31.

The apparatus now remains stationary while the core in the oven is being heated. After a predetermined period of time, the timer 94 closes a normally opened switch 112 to actuate the solenoid winding 88, thereby reversing the flow of fluid in the cylinder 81, and moving the member 83 to the left, as viewed in Fig. 7, thus opening the door 61. At the same time a spring biased stop member 113, carried by the member 83, closes a normally open switch which is in series with a solenoid winding 75 and the power line. Actuation of the winding 75 reverses the hydraulic valve 73 to admit fluid into the left end of the cylinder 71, thereby moving the push rods 43 to the right, or away from the oven 10. As the push rods 43 begin this return movement, a spring biased stop member 115 closes a normally open switch 116, thereby energizing the winding 117 of the double acting relay, indicated generally by the numeral 118, thus closing the pairs of contacts 119 and 121, thereby actuating a magnetic air valve 122 to admit air into the fin blow-off pipe 51. Thus as the pipe 51 moves across the core resting on the tray 18, air from the pipe 51 will remove any excess flux on the core fins and outer surfaces of the tubes. As the push rods 43 near the end of their return travel, the stop 115 closes a normally open switch 123, which actuates the winding 124 of the relay 118 to open the contacts 119 and 121, thus shutting off the air supply to the pipe 51. As the push rods reach the end of their return travel, stop 125 carried thereby, closes a normally open switch 126, thereby energizing the solenoid winding 74 to reverse the valve 73 and fluid into the cylinder 72, whereby the pusher rods 43 will immediately begin to move towards the oven 10, the dogs simultaneously encountering the core on the tray 18 and the core on the table 1, to move the same into the oven and onto the tray 18 respectively. As the pusher rods reach the end of said loading movement, the stop 91, carried thereby, closes the switch 89, thereby again actuating the solenoid winding 87 to move the member 83 and close the door 61, such movement of the member 83 instantaneously closing the switches 93 and 96 to initiate a new cycle of operation.

At the same time that the dogs 47 load cores into the oven and onto the tray 18, if desired, a similar dog 47¹ may push the heated core from the oven through a door similar to the door 61, also actuated by the member 83, and out of the oven, or other mechanism may be employed to accomplish these functions. Likewise, if desired, a squaring mechanism, similar to that illustrated in Patent No. 2,154,104, more specifically shown in claim in divisional Patent No. 2,185,381, dated January 2, 1940, may be employed, in which case the pusher rods 43 may in their loading stroke simultaneously remove a core from the squaring mechanism to an unloading table, as well as move a heated core from the oven into the squaring mechanism.

The details of the various hydraulic and air actuated mechanisms, as well as the details of the particular electrical switches employed, form no part of the present invention, and obviously other various types of mechanical means may be employed to open and close the door 61.

It will be apparent from the above disclosure that I have produced a novel means for efficiently removing surplus flux from both radiator core fins and tubes, in which the operation thereof is accomplished automatically during the operation of the machine, thereby resulting in a saving in time and fluxing material.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. In an apparatus for removing excess fluxing liquid from a radiator core, comprising a plurality of spaced tubes connected by a plurality of spaced fins, the combination of a supporting member upon which a fluxed core is adapted to rest, an air discharge pipe, mounted for reciprocation across an end of said core on which said tubes open, and adapted to communicate with a source of air under pressure for discharging air into the ends of such tubes during reciprocation of said pipe, and a second air discharge pipe, mounted for movement independently of and relative to said first pipe across the fin edges of such a core and adapted to communicate with a source of air under pressure for discharging air between the fins of such a core during such movement of said second pipe, the planes of movement of the respective pipes being transverse to each other with the respective pipes being movable in substantially parallel directions, and respective means for alternately moving the respective pipes across such a core.

2. In an apparatus for removing excess fluxing liquid from a radiator core, comprising a plurality of spaced tubes connected by a plurality of spaced fins, the combination of a supporting member upon which a fluxed core is adapted to rest, means for maintaining said member in either a horizontal or a tilted position, an air discharge pipe mounted for reciprocation across an end of said core on which said tubes open in a plane extending substantially parallel to the face of such end when said member is in a tilted position, and adapted to communicate with a source of air under pressure for discharging air into the ends of such tubes during reciprocation of said pipe, and a second air discharge pipe, mounted for movement across the fin edges of such a core in a plane extending substantially parallel to the plane of such fin edges when said member is in a horizontal position and adapted to communicate with a source of air under pressure for discharging air between the fins of such a core during such movement of said second pipe.

3. In an apparatus of the kind described, an article supporting member, and a pair of independently relatively movable air discharge pipes, the axes of which extend transversely to one another, each adapted to be connected to an air supply under pressure, one of said pipes being mounted for movement relative to said member in a direction transverse to the axis of said pipe for discharging air on an article supported by said member, and the other of said pipes being mounted for movement relative to said member in a direction transverse to the axis of such pipe and substantially parallel to the direction of movement of the other pipe for discharging air on such an article in a direction transverse to the air discharge from said first pipe and means for alternately moving the respective pipes across such an article.

4. In an apparatus of the kind described, the combination of an article supporting member movable into either of two positions, means for maintaining said member in either one of said positions, an elongated air discharge pipe constructed to discharge air therefrom in a direction transverse to the pipe axis and adapted to communicate with a source of air under pressure positioned adjacent said supporting member, means for moving said pipe relative to said member when the latter is in one position for discharging air along a face of an article positioned thereon with the axis of said pipe extending substantially parallel to such face, a second air discharge pipe, adapted to communicate with a source of air under pressure, said second pipe being constructed to discharge air therefrom in a direction transverse to the pipe axis, and means for moving said second pipe relative to said first pipe and said supporting member when the latter is in a second position for discharging air along another face of an article positioned thereon, with the axis of said second pipe extending substantially parallel to said last mentioned face.

5. In an apparatus of the kind described, the combination of an article supporting member movable into either of two positions, means for maintaining said member in either one of said positions, an air discharge pipe adapted to communicate with a source of air under pressure positioned adjacent said supporting member, means for moving said pipe relative to said member when the latter is in a position for discharging air along a face of an article positioned thereon, a second air discharge pipe, adapted to communicate with a source of air under pressure, and means for moving said second pipe relative to said first pipe and said supporting member when the latter is in a second position for discharging air along another face of an article positioned thereon, and means for admitting air into the respective discharge pipes from their air supply only when the supporting member is in respective pre-determined positions and during movement of the respective pipes relative to such article.

6. In an apparatus for removing excess fluxing liquid from a radiator core comprising a plurality of spaced tubes connected by a plurality of spaced fins, the combination of a vertically movable supporting carrier member upon which a fluxed core is adapted to rest, said carrier member comprising a pivotally mounted core supporting member adapted to support the core and the respective tubes thereof in an inclined position, an air discharge pipe mounted for movement across the upper ends of the tubes of a core supported in an inclined position by said core supporting member and adapted to communicate with a source of air under pressure for discharging air into the upper ends of said tubes during the movement of said pipe, control means for the apparatus operatively connected to the carrier member and adapted for controlling the apparatus in a predetermined cycle of operation, and reciprocating means for moving said pipe across the tube ends operatively connected to the air discharge pipe and actuated by said carrier member when the core is supported in an inclined position by said core supporting member in the raised position of said carrier member.

7. In an apparatus of the kind described, the combination of a supporting carrier member upon which articles to be processed are adapted to rest, said supporting carrier member being movable into two predetermined positions, a pair of spaced rails positioned above and to one side of an article positioned on said carrier member, means for rigidly supporting said rails in operative relation, an arm extending downwardly between said rails and movable along the latter, an air discharge pipe secured to said arm and having discharge openings adjacent a face of an article resting on said supporting carrier member, reciprocatory means actuatable by said supporting carrier member when the latter is in one of said predetermined positions for reciprocating said arm along said rails, control means for actuating the apparatus in a predetermined cycle operatively connected to the reciprocatory means and to said carrier member, and valve means operatively connected to said control means and actuated by movement of said arm for connecting said pipe to a source of air under pressure during reciprocation thereof to discharge air along said article face.

GEORGE H. TRURAN.

REFERENCES CITED

The following references are of record in the file of this patent:

UNITED STATES PATENTS

| Number | Name | Date |
|---|---|---|
| 766,510 | Munn | Aug. 2, 1904 |
| 993,743 | Wright | May 30, 1911 |
| 1,043,011 | Hoofnagle | Oct. 29, 1912 |
| 1,364,121 | Leyland | Jan. 4, 1921 |
| 1,628,317 | Hoevel | May 10, 1927 |
| 1,655,767 | Hoevel | Jan. 10, 1928 |
| 1,679,369 | Motz | Aug. 7, 1928 |
| 1,711,763 | White | May 7, 1929 |
| 1,978,555 | Snow | Oct. 30, 1934 |
| 2,003,668 | Pittenger | June 4, 1935 |
| 2,115,885 | Simpson | May 3, 1938 |
| 2,154,104 | Munch et al. | Apr. 11, 1939 |
| 2,207,675 | Arey | July 9, 1940 |
| 2,216,698 | Arey | Oct. 1, 1940 |
| 2,225,946 | Arey | Dec. 24, 1940 |
| 2,229,184 | Munch et al. | Jan. 21, 1941 |